United States Patent [19]

Tatematsu et al.

[11] Patent Number: 5,531,079
[45] Date of Patent: Jul. 2, 1996

[54] BEARING STRUCTURE FOR AUGER-TYPE ICE MAKING MACHINES

[76] Inventors: Susumu Tatematsu, 5-12-1, Josai, Nishi-ku, Nagoya-shi, Aichi-ken; Hiroyuki Sugie, 15-9, Higashiyamadai, Miyoshi-cho, Nishikamo-gun, Aichi-ken; Naoya Uchida, Sakyoyama Kopo B201, 2108 Sakyoyama, Midori-ku, Nagoya-shi, Aichi-ken; Yasumitsu Tsukiyama, 2-68, Dengakugakubo, Kutsukake-cho, Toyoake-shi, Aichi-ken; Hideyuki Ikari, 6-35, Hoochida, Imagawa-cho, Kariya-shi, Aichi-ken, all of Japan

[21] Appl. No.: 319,010

[22] Filed: Oct. 6, 1994

[30] Foreign Application Priority Data

Oct. 7, 1993 [JP] Japan .................. 5-054574 U
Dec. 6, 1993 [JP] Japan .................. 5-065035 U

[51] Int. Cl.⁶ .................................................. F25C 5/12
[52] U.S. Cl. ................................................ 62/354; 384/624
[58] Field of Search ......................... 62/354; 165/94; 384/624

[56] References Cited

U.S. PATENT DOCUMENTS 3,183,682  5/1965  Conto ............................... 62/298
3,196,628  7/1965  Reynolds ....................... 62/354 X
3,230,737  1/1966  Lunde ............................. 62/354
4,497,184  2/1985  Utter et al. ..................... 62/354
4,741,173  5/1988  Neumann ........................ 62/298

Primary Examiner—William E. Tapolcai

[57] ABSTRACT

A bearing structure for an auger-type ice making machine 10 includes: an auger 17 having a helical blade 17a which rotates within a cylindrical refrigeration casing 11 so as to scrape off ice generated on the inner surface of the refrigeration casing 11 and push it up and out of the casing; a slide bearing 27 for supporting an upper shaft section 17b of the auger17; and, a press head 25 which is provided inside the upper end portion of the refrigeration casing 11 and which supports the slide bearing 27, wherein even if the upper shaft section 17b of the auger 17 and the press head 25 make an axial relative movement as a result of the scraping off and feeding-out of the ice, substantially closed first and second foreign matter trapp spaces A and B are formed in close proximity to the lower and upper ends of the slide bearing. Further, a high-hardness metal layer 17f having a thickness, for example, of approximately 0.5 mm is formed on the surface of the upper shaft section 17b of the auger 17. Any exfoliated portion of the bearing section is trapped in the foreign matter trap spaces, and a satisfactory slideface is formed between the slide bearing and the high-hardness metal layer to achieve a substantial improvement in wear resistance properties.

13 Claims, 9 Drawing Sheets

BEARING STRUCTURE FOR AUGER-TYPE ICE MAKING MACHINES

BACKGROUND OF THE INVENTION (1) Field of the Invention

This invention relates to an auger-type ice making machine and, in particular, to the structure of an upper bearing for rotatably supporting the upper section of the auger.

(2) Description of the Related Art

In an auger-type ice making machine, a refrigeration casing is cooled from the outside to generate ice on the inner surface of the casing. The ice is scraped off by a helical blade and pushed up and out of the casing. FIG. 13 shows a part of a typical conventional auger-type ice making machine. In the drawing, a cylindrical refrigeration casing 1 holds at its upper end a press head 3, which includes an ice compression passage (not shown). The ice which has been scraped off is compressed as it is led upward through this compression passage. The press head 3 supports an upper shaft section 7b of an auger 7 through the intermediation of a slide bearing 5.

As can be seen from FIG. 13, the auger 7 includes a helical blade 7a, which scrapes off ice and feeds it upwards, thereby receiving a downwardly directed resistance force. The press head 3, which is pressed by the ice being scraped off and fed upwards, receives an upwardly directed force. Due to these downwardly and upwardly directed resistance forces, the gap between the lower end surface 3a of the press head 3 and the shoulder surface 7d of the auger 7 tends to become enlarged. Further, when the ice making water freezes, impurities in the water, such as silica and calcium, have a tendency to move to the unfrozen portions of the water, resulting in increased concentrations near the lower end of the press head 3, where these impurities are likely to be deposited. These deposited impurities in the form of fine solid particles are easily forced into the slide bearing 5 through the enlarged gap. It goes without saying that infiltration by solid impurities into the bearing surface is likely to cause damage to the bearing.

The ice pushed out of the casing 1, after passing upwards through the ice compression passage, is cut to a predetermined size by a cutter 9 attached to the upper end of the auger 7. Thus, the upper shaft section 7b of the auger 7 receives a reaction force when the ice is cut, so that the bearing section is subject to great frictional force. Thus, the bearing section of the upper shaft section 7b of the auger 7 is in a severe environment in terms of the load applied thereto as well as from the matter deposited on the bearing surface.

In view of the above, various proposals have been made for the purpose of protecting the upper bearing section of an auger-type ice making machine from damage. According to one such proposal, a thrust bearing is provided at the upper end of the upper shaft section to thereby transmit the downwardly directed force of the auger to the press head. Further, a radial bearing is provided at the lower end of the upper shaft section to thereby receive any torque reaction. Due to this arrangement, the auger and the press head are integrated, so as to prevent the generation of a gap therebetween. Further, the two bearings are surrounded by two oil seals, thereby preventing the penetration of water and impurities and the leakage of lubricant (See Japanese Patent Laid-Open No. 58-21020).

According to another proposal, a plurality of grooves are provided on both the upper shaft section of the auger and the lower section of the press head, which is placed above the helical blade to correspond thereto. In these grooves, sherbet-like ice, which would otherwise penetrate the bearing section as a result of being pressurized in the compression passage, is solidified, thereby preventing the penetration of ice or other foreign matter into the bearing section (See Japanese Utility Model Laid-Open No. 60-187887).

According to a third proposal, a recess is formed in the lower section of the press head or in the upper end surface of the helical blade of the auger, and a sliding member is provided in this recess, thereby preventing abnormal wear of the press head and the auger, which are made of the same material (See Japanese Utility Model Publication No. 61-32304).

Further, in accordance with a fourth proposal, the rib forming the ice compression passage of the press head protrudes downwards from the boss section, and a washer for adjusting the gap between the rib and the auger upper surface is provided in the recess, thereby preventing both clogging by ice and the radial displacement of the auger (See Japanese Utility Model Publication No. 3-36858).

In accordance with the first proposal, the press head and the auger are integrated to keep the dimension of the gap therebetween constant. However, when particles of sherbet-like ice or foreign matter in the water are pressed against the lip of the lower oil seal, the lip is liable to suffer damage, resulting in a reduction of the service life of the bearing due to water penetration, lubricant leakage, etc. Thus, this proposal cannot easily be put into practical use. In the second proposal, the sherbet-like ice infiltrating the grooves is solidified to prevent foreign matter in the water from penetrating the bearing section. This effect, however, cannot be obtained in the early stages of operation. As to the third and fourth proposals, in which the case of a washer or the like is adopted, the gap has a tendency to expand, as described above, due to the directions in which forces are applied, so that the expected effect can not be attained.

Thus, each of these proposals has its merits and demerits, which means none of them completely solve the problems of the prior art.

SUMMARY OF THE INVENTION

The present invention has been accomplished in view of the above situation. It is the object of this invention to provide a bearing structure that is both safe and has high wear resistance properties, which suffers practically no damage even when foreign matter penetrates therein, and further, which allows no foreign matter which may somehow be generated in the bearing section to be transferred to the ice making section and thereby mix in the ice.

To achieve the above object, the present invention provides a bearing structure of an auger-type ice making machine, comprising: an auger having a helical blade which rotates within a vertical, cylindrical refrigeration casing so as to scrape off ice generated on the inner surface of the refrigeration cylinder and push it up and out of the casing; a slide bearing for supporting an upper shaft section of the auger; and a press head provided within the upper end portion of the refrigeration casing for supporting the slide bearing. Even if the upper shaft section of the auger and the press head have a relative axial movement as a result of the scraping off and feeding-out of the ice, substantially closed first and second foreign matter trap spaces are formed in close proximity to the lower and upper ends of the slide bearing. Further, a high-hardness metal layer having a thickness, for example, of approximately 0.5 mm (1.97× $10^{-2}$ inch) may be formed on the surface of the upper shaft section of the auger.

In the bearing structure for an auger-type ice making machines of the present invention, any foreign matter generated by the exfoliation of a part of the bearing section is trapped in the foreign matter trap spaces, and since no special lubricant is used in the bearing section, the inclusion of foreign matter in the ice can be prevented. Further, due to the high-hardness metal layer formed on the surface of the upper shaft section of the auger, a favorable slideface is formed between the bearing surface of the slide bearing and the high-hardness metal layer, thereby attaining a substantial improvement in terms of wear resistance properties.

DESCRIPTION OF THE PREFERRED EMBODIMENTS

Figure 1:
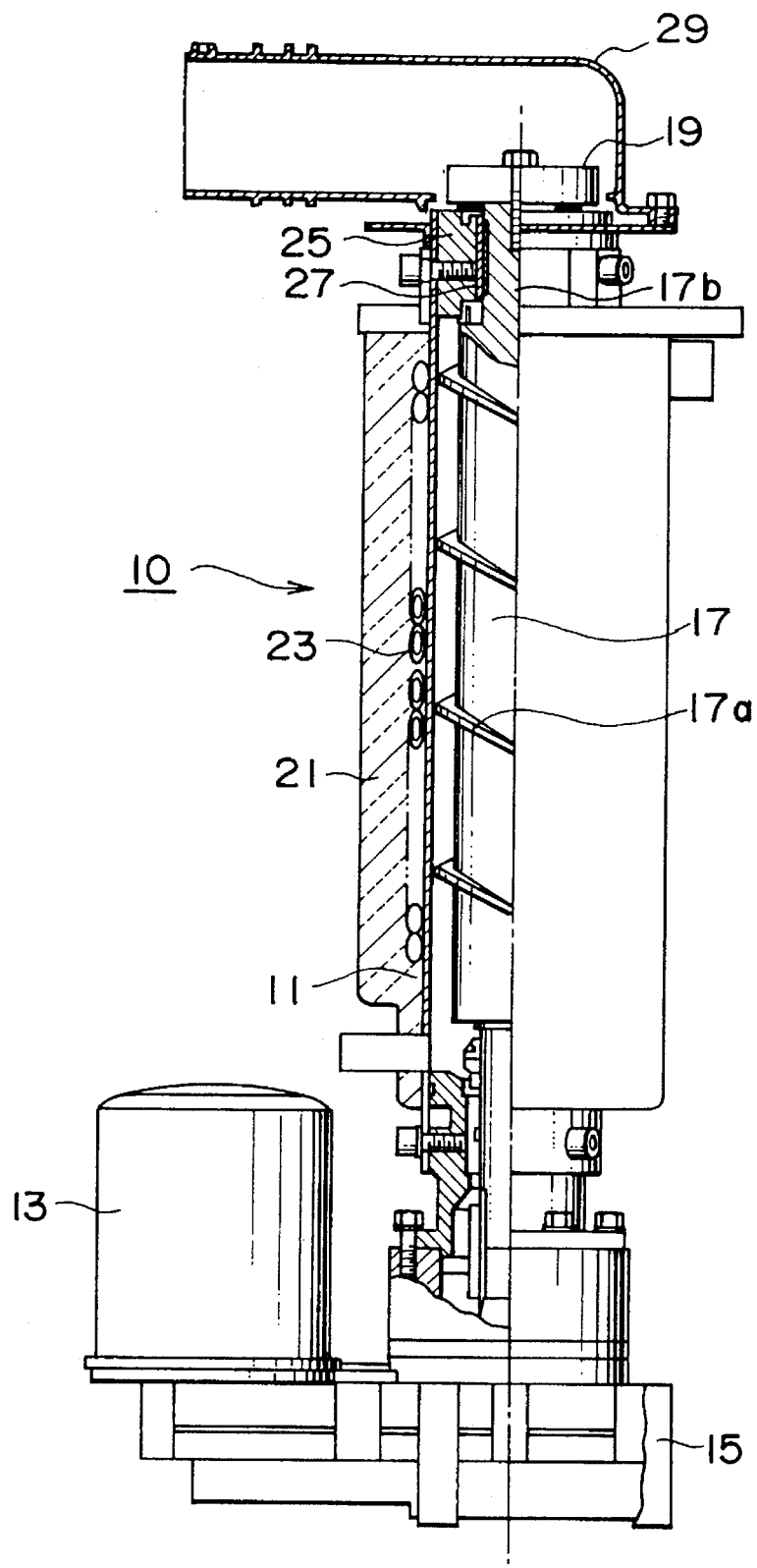
FIG. 1 is an elevational view, partly in cross section, of an auger-type ice making machine having a bearing structure according to Embodiment 1 of the present invention.

Preferred embodiments of the present invention will now be described in detail below with reference to the accompanying drawings, in which the same reference numerals indicate the same or equivalent components.

EMBODIMENT 1

FIG. 1 is an elevational view, partly in cross section, of an auger-type ice making machine 10 having a bearing structure according to Embodiment 1 of the present invention. The auger-type ice making machine 10 includes a refrigeration casing 11 having a cylindrical configuration and supported at its lower end by a casing 15 connected with a geared motor 13. An auger 17 is coaxially arranged within the refrigeration casing 11 and driven by the geared motor 13 through a power transmission mechanism (not shown). The auger 17 has a helical blade 17a on its peripheral surface and, further, has an upper shaft section 17b with a reduced diameter. A cutter 19 is fastened to the upper end of the upper shaft section 17b.

The outer surface of the refrigeration casing 11 is covered with a heat insulating material 21, and a refrigerant evaporation tube 23 is provided between the heat insulating material 21 and, the refrigeration casing 11. The refrigerant evaporation tube 23, which is wound around the outer peripheral surface of the refrigeration casing 11, serves to cool the refrigeration casing 11 and the ice making water contained therein by utilizing the heat of evaporation of the refrigerant flowing through this evaporation tube 23. A press head 25 is secured in position within the upper end portion of the refrigeration casing 11. A slide bearing 27 is provided on the inner surface of the press head 25 so as to rotatably support the upper shaft section 17b of the auger 17. An ice discharge chute 29, which surrounds the cutter 19, is fastened to the outer periphery of the upper end portion of the refrigeration casing 11.

Figure 2:
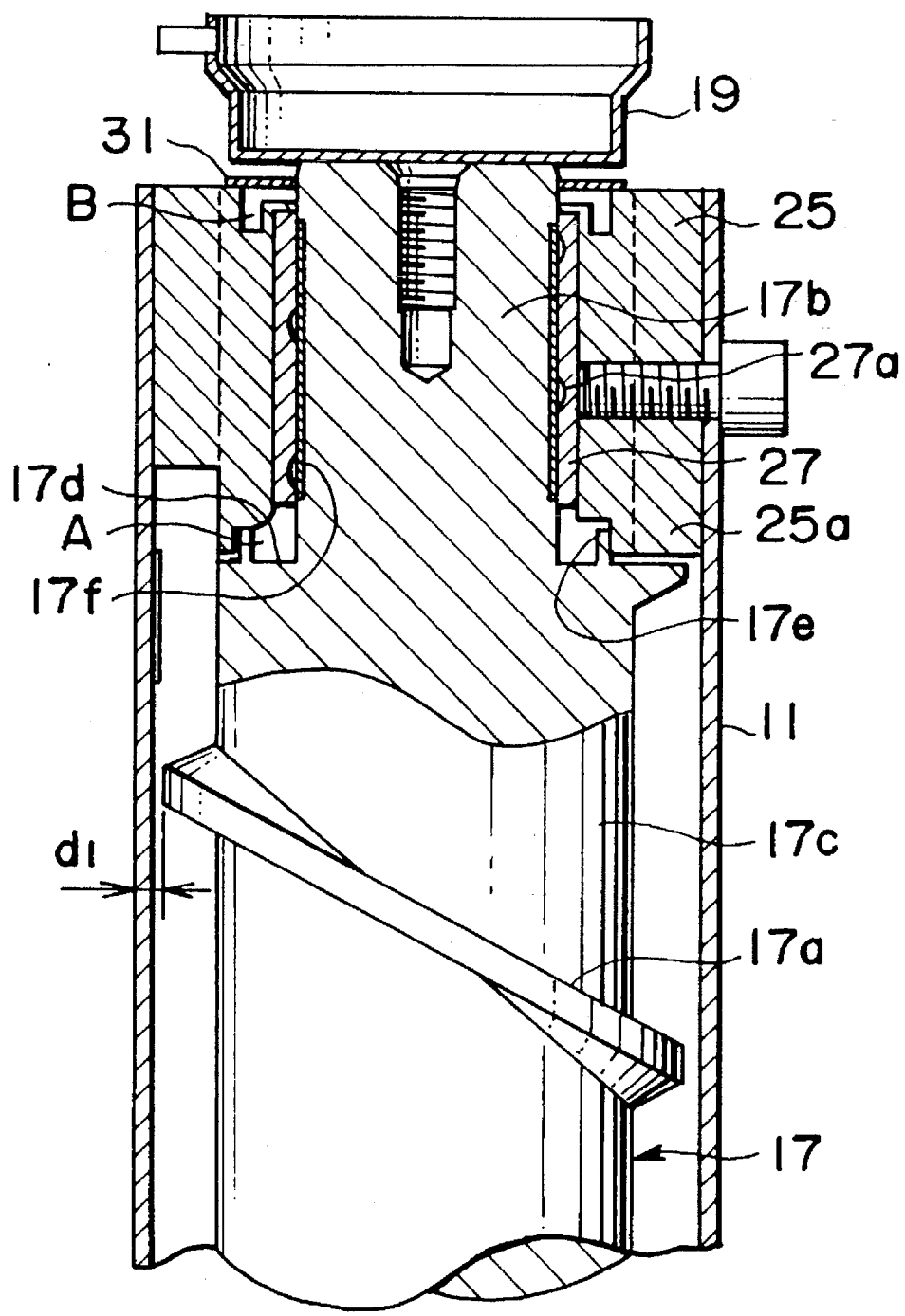
FIG. 2 is a sectional view showing the bearing structure of Embodiment 1.

FIG. 2 is an enlarged view centering on the bearing structure in the upper section of the refrigeration casing 11. It is desirable for a gap $d_1$ between the helical blade 17a of the auger 17 and the inner wall surface of the refrigeration casing 11 to be as small as possible; in this embodiment, the gap is approximately 0.5 mm (1.97×$10^{-2}$ inch).

Figure 3:
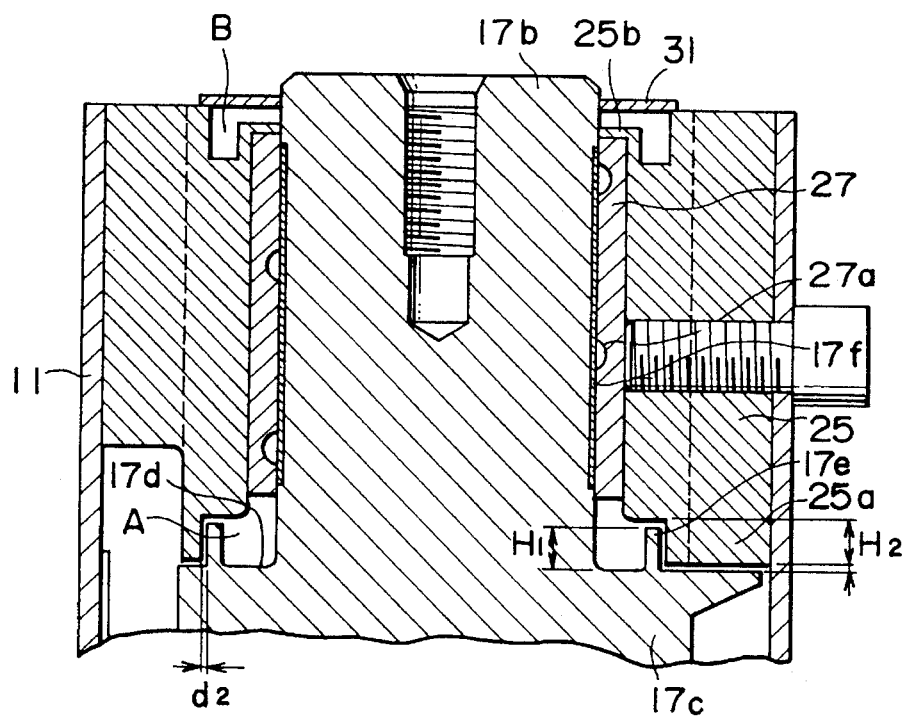
FIG. 3 is an enlarged sectional diagrammatic view showing essential components of the bearing structure of Embodiment 1.

FIG. 3 is a sectional view of the bearing section of FIG. 2 further enlarged to show the outer configurations of the components. A shoulder portion is formed between a large diameter section 17c of the auger 17, on which the helical blade 17a is formed, and the upper shaft section 17b. The radial surface of this shoulder portion constitutes a shoulder surface 17d, on which is formed a substantially vertical annular protrusion 17e. A first foreign-matter trap space or foreign matter accumulator A is defined by the annular protrusion 17e of the shoulder portion of the auger 17, the lower end of the slide bearing 27, and the press head 25.

An ice compression passage (not shown) for feeding ice upwards is formed in the press head 25 which supports the slide bearing 27. The lower end portion of the press head 25 extends downward as a lower-end peripheral section 25a, which surrounds the outer peripheral surface of the annular protrusion 17e of the auger 17. An annular gap having a radial dimension $d_2$ is defined between the inner peripheral surface of the lower-end peripheral section 25a and the outer peripheral surface of the annular protrusion 17e.

An annular recess or upper end space is provided in the upper-end inner peripheral section of the press head 25, and an annular protrusion 25b adapted to engage with the slide bearing 27 is provided within this upper end space. Further, an annular cover 31 is provided in the upper-end inner peripheral section of the press head 25 in such a way as to close the upper end space. A second foreign-matter trap space or foreign matter accumulator B is formed by the press head 25, the annular cover 31 and the upper shaft section 17b of the auger 17.

A metal layer 17f consisting of a welded high-hardness metal is formed in that section of the outer peripheral surface of the upper shaft section 17b of the auger 17 which is surrounded by the slide bearing 27. A nickel-chrome alloy, a nickel-chrome alloy containing tungsten-carbide, and the like may be used as the high-hardness metal. Preferably, the alloy has a content distribution in which the content of nickel is higher than that of chrome. A helical groove 27a is formed on the bearing surface of the slide bearing 27. The helical groove 27a serves to supply the slideface between the bearing surface of the slide bearing 27 and the high-hardness metal layer 17f with water as a lubricant from the first trap space A. Further, the helical groove 27a also serves to upwardly discharge any foreign matter that is small enough to easily pass through this groove, by the rotation of the auger upper shaft and hydraulic pressure (due to, the pressure generated in the press head 25).

It is desirable for the radial dimension $d_2$ of the above-mentioned annular gap to be as small as possible. Generally speaking, the dimension preferably consists of the sum of any gap variations arising from production tolerances of the members, the anticipated wear amount of the bearing section, and some additional amount for clearance. The height $H_1$ of the annular protrusion 17e is somewhat smaller than the height $H_2$ of the lower-end outer peripheral section 25a. It is desirable for the total volume of the foreign matter accumulators A and B to be as large as possible. The volume is preferably at least 1.5 times as large as the total volume of the high-hardness metal layer 17f.

In the above-described construction, it is desirable for the thickness of the high-hardness metal layer 17f, which is formed on the outer surface of the upper shaft section 17b of the auger 17, to be such that no local force causing plastic deformation of the shaft material is applied when it receives a surface pressure generated by penetration of hard foreign matter into the surface during operation. This thickness, which varies depending upon the metal used, is preferably not smaller than 0.3 mm ($1.18 \times 10^{-2}$ inch). In this embodiment, the thickness is 0.5 mm ($1.97 \times 10^{-2}$ inch). This thickness allows a preferable slideface suitable for ice making operations to be formed between the bearing surface of the slide bearing 27 and the high-hardness metal layer 17f, whereby a substantial improvement in wear resistance properties can be achieved. Further, if a part of the metal layer 17f exfoliates as a result of corrosion developed in defective parts, such as pin-holes generated through extended operation the exfoliated pieces are trapped in the foreign matter accumulators A and B. Thus, intrusion of foreign matter into the ice can be prevented. Further, the wear resistance properties of the bearing are not impaired by such exfoliation.

Next, the operation of the auger-type ice making machine, constructed as described above, will be described. The refrigeration casing 11 is cooled from the outside, whereby the ice-making water contained therein is frozen on the inner surface thereby, and the ice thus formed therein grows. The ice is scraped off by the helical blade 17a of the auger 17, which is driven by the geared motor 13, and is fed upwards. The upwardly fed ice is solidified as it passes through the compression passage (not shown) of the pressure head 25. The solidified ice is cut into a predetermined size by the cutter 19, which rotates with the auger 17, and is discharged through the discharge chute 29.

As a result of the scraping off and feeding-out of the ice, a downwardly directed force is applied to the auger 17. At the same time, an upwardly directed force is applied to the press head 25. However, the annular protrusion 17e and the lower-end peripheral section 25a move only in a relatively axial direction, without causing the dimension $d_2$ of the annual gap therebetween to undergo any change. The slide bearing 27 slidably supports the upper shaft section 17b of the auger 17, while supplying water, which serves as a lubricant, through the helical groove 27a to the slideface. Any foreign matter generated on the metal layer 17f, the slide bearing 27, etc. as a result of exfoliation or the like is trapped by the substantially closed first and second foreign matter accumulators A and B.

Figure 4:
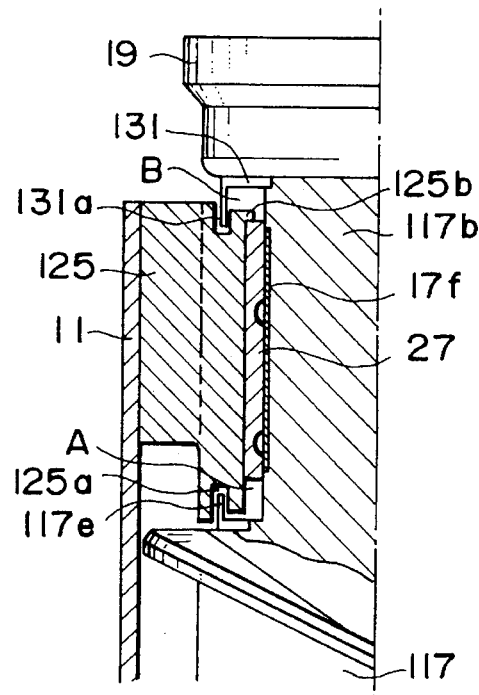
FIG. 4 is a partial sectional view of a modification of the bearing structure of Embodiment 1.
Figure 5:
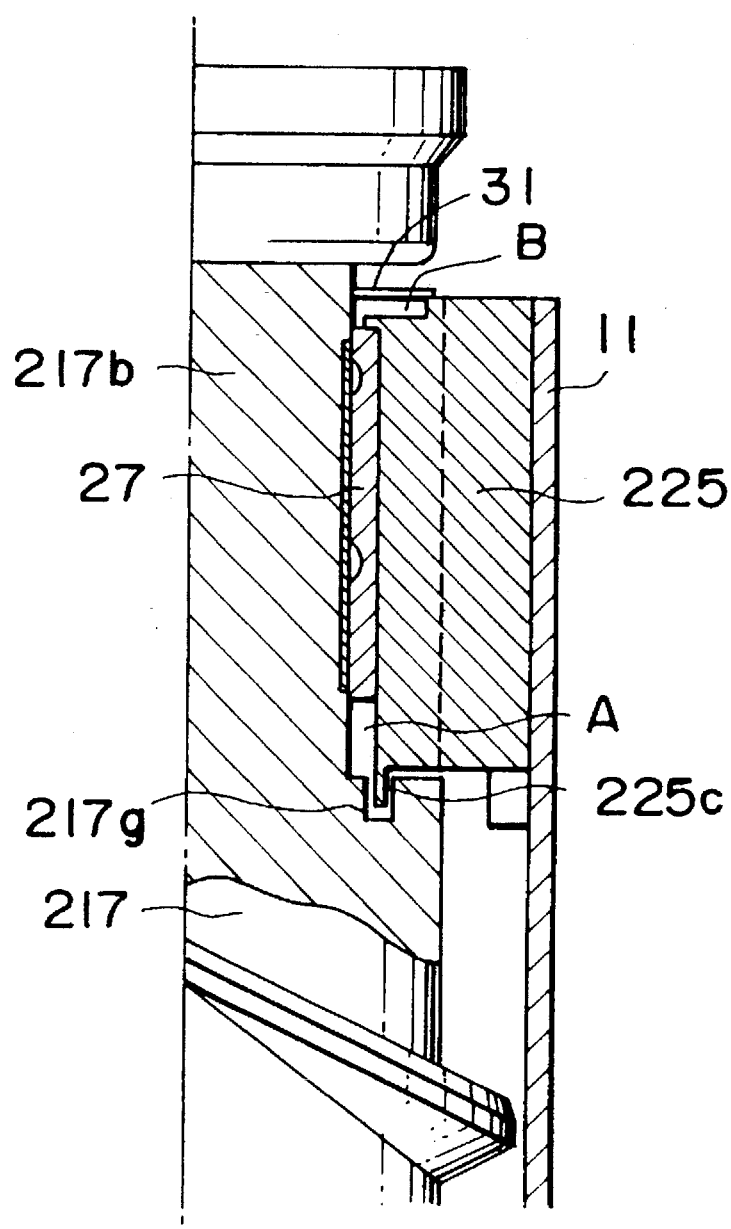
FIG. 5 is a partial sectional view of another modification of the bearing structure of Embodiment 1.

The first and second foreign matter accumulators A and B may be formed as shown in FIGS. 4 and 5. In the drawings, numerals 117 and 217 indicate the auger; the numerals 117b and 217b indicate the upper shaft section of the auger; and numerals 125 and 225 indicate the press head.

In FIG. 4, a press head 125 has a downwardly extending lower-end inner peripheral section, which has on the lower end surface thereof an axially cut annular groove 125a. The annular groove 125a engages with an annular protrusion 117e on the shoulder surface of an auger 117. The shoulder portion of the auger 117, the slide bearing 27, and the press head 125 form a first foreign matter accumulator A. Provided at the upper end of the upper shaft section 117b of the auger 117 is an annular cover 131 having an edge portion which is bent downwardly to form a substantially vertical annular edge portion 131a. This annular edge portion 131a is engaged with the outer peripheral surface of an annular protrusion 125b, which is provided in the inner peripheral section of the upper end portion of the press head 125 for the purpose of locking the slide bearing 27. The press head 125, the annular cover 131, and the upper shaft section 117b of the auger 117 form a second foreign matter accumulator B.

In FIG. 5, an annular groove 217g is axially formed in the shoulder portion of the auger 217 to engage with an annular protrusion 225c formed on the inner periphery of the lower end portion of a press-head 225. The shoulder portion of an auger 217, the lower end of the slide bearing 27, and the press head 225 form a first foreign matter accumulator A. An annular cover 31 is fixed on the inner periphery of the upper end surface of the press head 225 in such a way as to close the upper trap space. The press head 225, the annular cover 31, and the upper shaft section 217b of the auger form a second foreign matter accumulator B.

As described above, in the bearing structure of the auger-type ice making machine 10 according to the present invention, foreign matter trap spaces A and B are formed in close proximity to the upper and lower ends of the slide bearing 27 which supports the upper shaft section 17b of the auger, so that any foreign matter generated in the bearing section is trapped in theses trap spaces. Thus, foreign matter is prevented from flowing into the ice making section and mixing with the ice, thereby making it always possible to produce sanitary, safe ice. Further, since the dimension $d_2$ of the gap leading from the lower foreign matter trap space A to the ice making section is always kept constant, foreign matter contained in the ice making water is prevented from penetrating the bearing section through this gap., thereby achieving a substantial improvement in wear resistance properties.

EMBODIMENT 2

Figure 6:
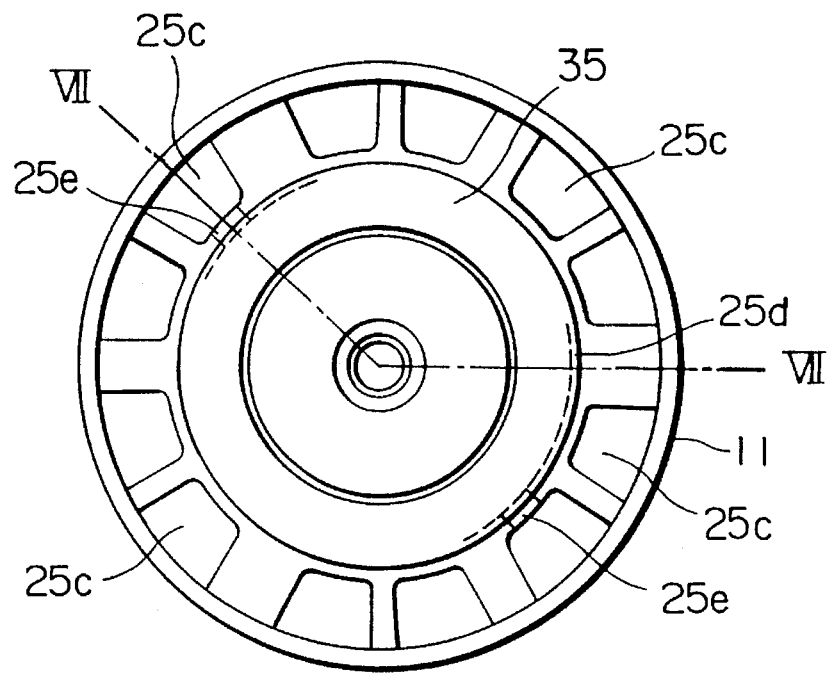
FIG. 6 is a plan view showing the essential components of the bearing structure of Embodiment 2.
Figure 7:
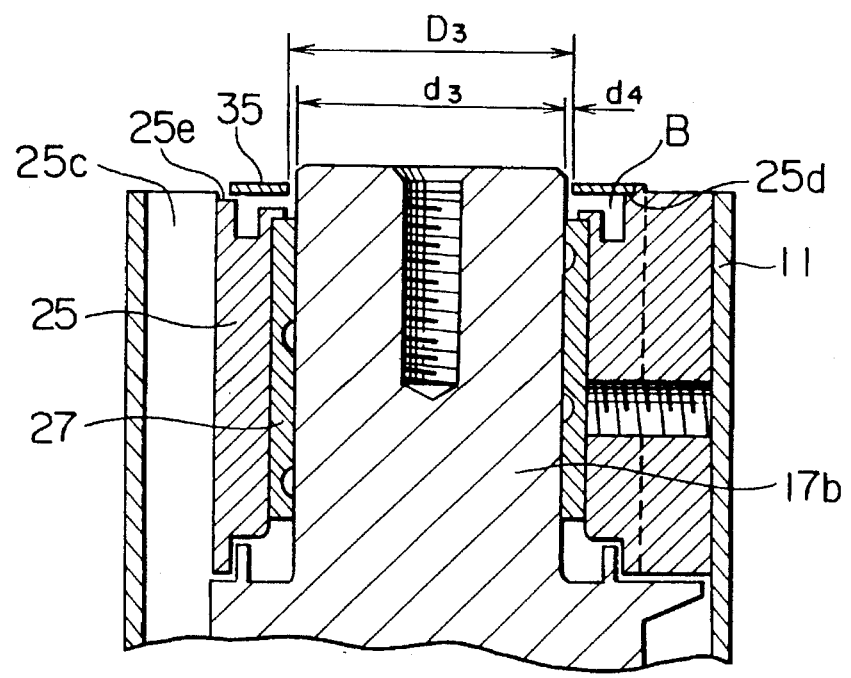
FIG. 7 is a sectional view taken along line VII—VII of FIG. 6.

Instead of the annular cover 31 used in Ebodiment 1 for the purpose of forming the second foreign matter trap space, Embodiment 2 uses a gauge ring 35 for detecting the wear amount of the slide bearing 27 and the upper shaft section 17b. The gauge ring 35 is provided on the upper surface of the press head 25. FIGS. 6 and 7 are enlarged views showing how the gauge ring 35 is mounted. In the drawings, an annular step 25d is formed by machining on the upper surface of the press head 25, which defines a plurality of ice compression passages 25c in the outer peripheral section thereof. The gauge ring 35 is fitted into the depression formed by the annular step 25d. Recesses 25e are provided adjacent to the annular step 25d, which recesses are utilized in attaching and detaching the gauge ring 35.

Thus, the gauge ring 35, fitted into the depression formed by the annular step 25d of the press head 25, is in a satisfactory coaxial relationship with the upper shaft section 17b of the auger 17, which is inserted into the press head 25. Assuming that the permissible wear dimension of the slide bearing 27 and the upper shaft section 17b is L, it is desirable that the design difference (gap) 2·d$_4$ between the inner diameter D$_3$ of the gauge ring 35 and the outer diameter d$_3$ of the upper shaft section 17b be set within a range which satisfies the following condition:

$$L-0.05 \leq d_4 \leq L$$

Assuming that the design gap between the inner surface of the refrigeration casing 11 and the helical blade 17a of the auger 17 is d$_1$ (see FIG. 1), the permissible wear dimension L is set as follows, taking the manufacturing tolerances of the relevant parts into account:

$$L=(1/2\sim3/5)\times d_1$$

When operating the auger-type ice making machine 10, using the gauge ring 35, whose size and configuration are set as described above, and the upper shaft section 17b of the auger 17, the operation is first continued for a fixed period. Then, at a periodic inspection, the ice discharge chute 29 and the cutter 19 are removed to examine the gap between the gauge ring 35 and the upper shaft section 17b. When the result of the examination indicates that the gap is L/2 or more where it is smallest, the ice making machine is allowed to resume its operation. When the gap is smaller than L/2, the wear condition of the bearing 27 and the upper shaft section 17 is checked through overhaul, and the bearing 27 and/or the upper shaft section 17b are/is replaced.

Figure 8:
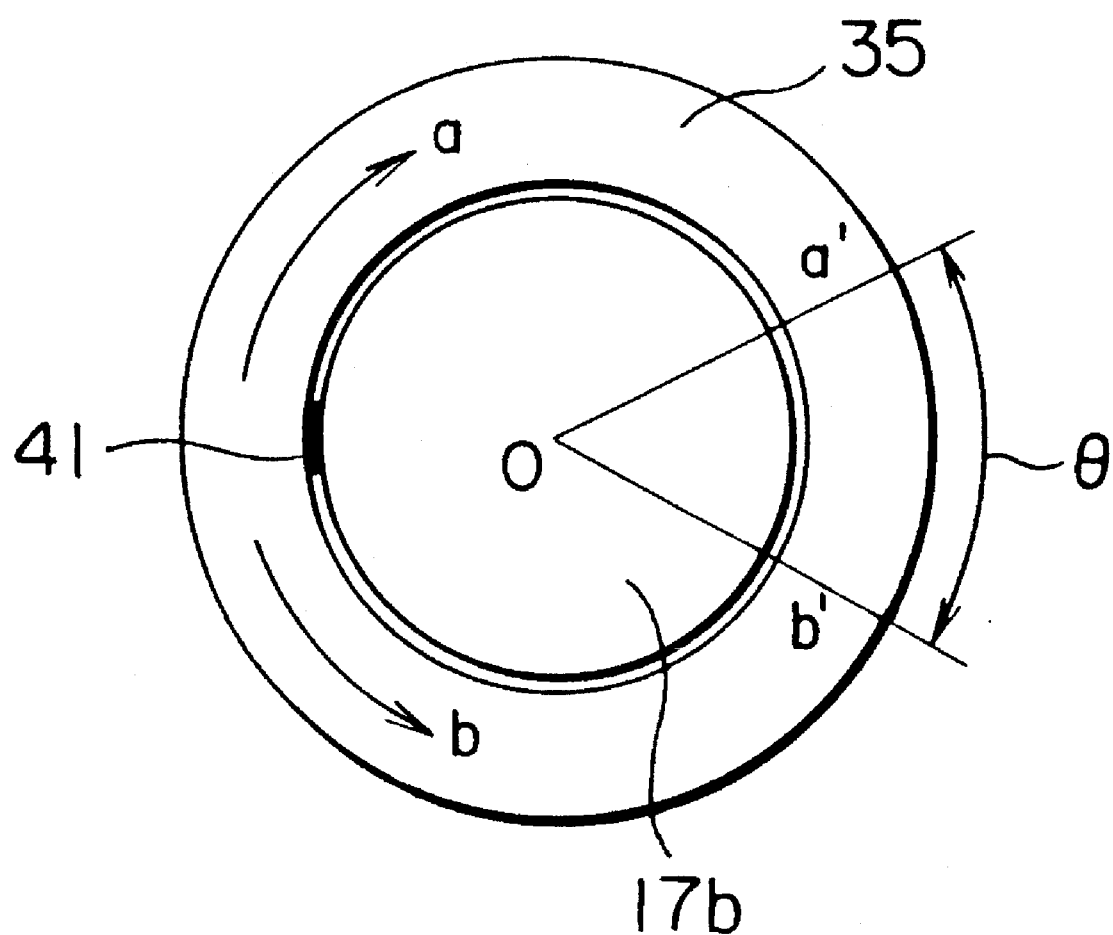
FIG. 8 is a view showing an inspection method used in Embodiment 2.

FIG. 8 shows an inspection method, according to which a clearance gauge 41 (whose thickness is L/2) is inserted into the gap where it is largest, and moved in the directions indicated by arrows a and b. If the gauge is not stopped, there is no need to replace the parts. The greater the angle θ made by the positions a' and b' where the gauge is stopped and the center O, the larger the wear amount.

The gap between the gauge ring 35 and the upper shaft section 17b of the auger 17 can be inspected as described. Further, by removing the gauge ring 35 by utilizing the recesses 25e, any foreign matter accumulated in the foreign matter accumulator B can be easily detected.

EMBODIMENT 3

Figure 9:
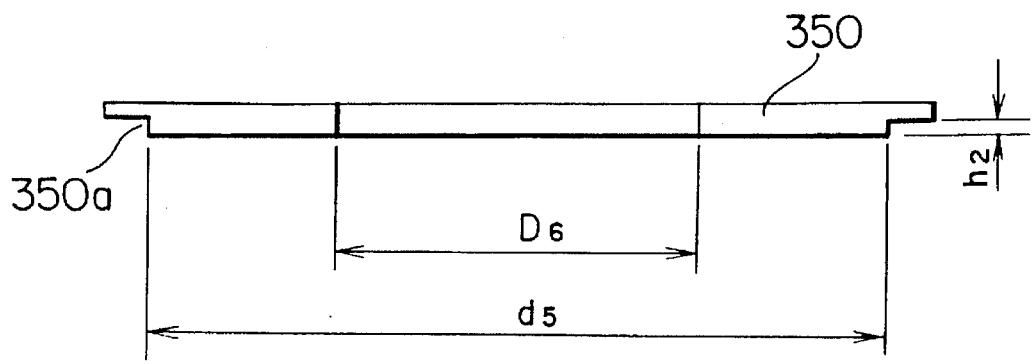
FIG. 9 is a sectional view showing a gauge ring used in Embodiment 3.
Figure 10:
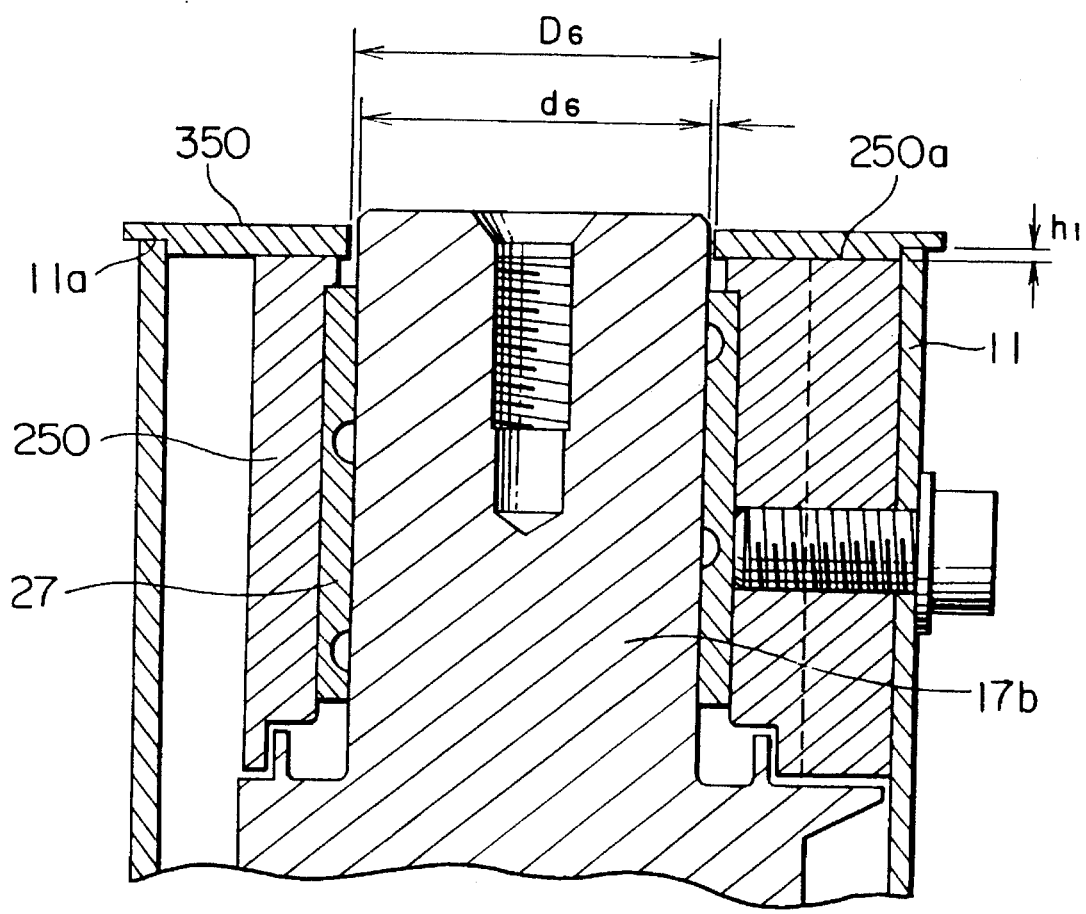
FIG. 10 is a sectional view showing the bearing structure of Embodiment 3.

In FIGS. 9 and 10, an upper end 11a of the refrigeration casing 11 is higher than an upper surface 250a of a press head 250 fastened to the upper section of the refrigeration casing 11 by means of a bolt. The difference in height is h$_1$.

A gauge ring 350 having a step section 350a is fitted, in a state of clearance fit, into an annular recess formed by the upper end 11a of the refrigeration casing 11 and the upper surface 250a of the press head 250. The step section 350a of the gauge ring 350 has an outer diameter d$_5$ and a height h$_2$, which is not larger than h$_1$. The design gap 2·d$_4$ between the inner diameter D$_6$ of the gauge ring 350 and the outer diameter d$_6$ of the upper shaft section 17b is set within a range which satisfies the following condition using the permissible wear dimension L:

$$L-0.05 \leq d_4 \leq L$$

The gauge ring 350 is in a satisfactory coaxial relationship with the upper shaft section 17b of the auger 17, which is inserted into the press head 250 fitted into the refrigeration casing 11. Thus, by examining the gap between the inner diameter D$_6$ of the gauge ring 350 and the outer diameter d$_6$ of the upper shaft section 17b of the auger 17, it is possible to judge the wear condition of the slide bearing 27 and the upper shaft section 17b.

Figure 11:
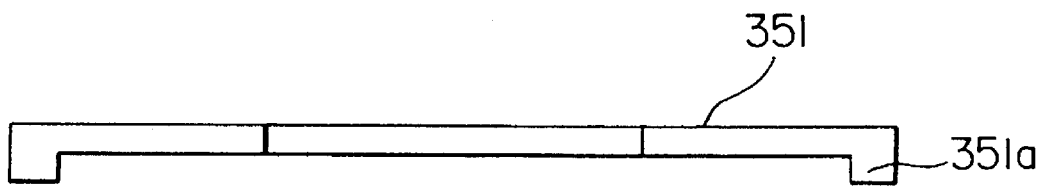
FIG. 11 is a sectional view showing a modification of the gauge ring used in Embodiment 3.
Figure 12:
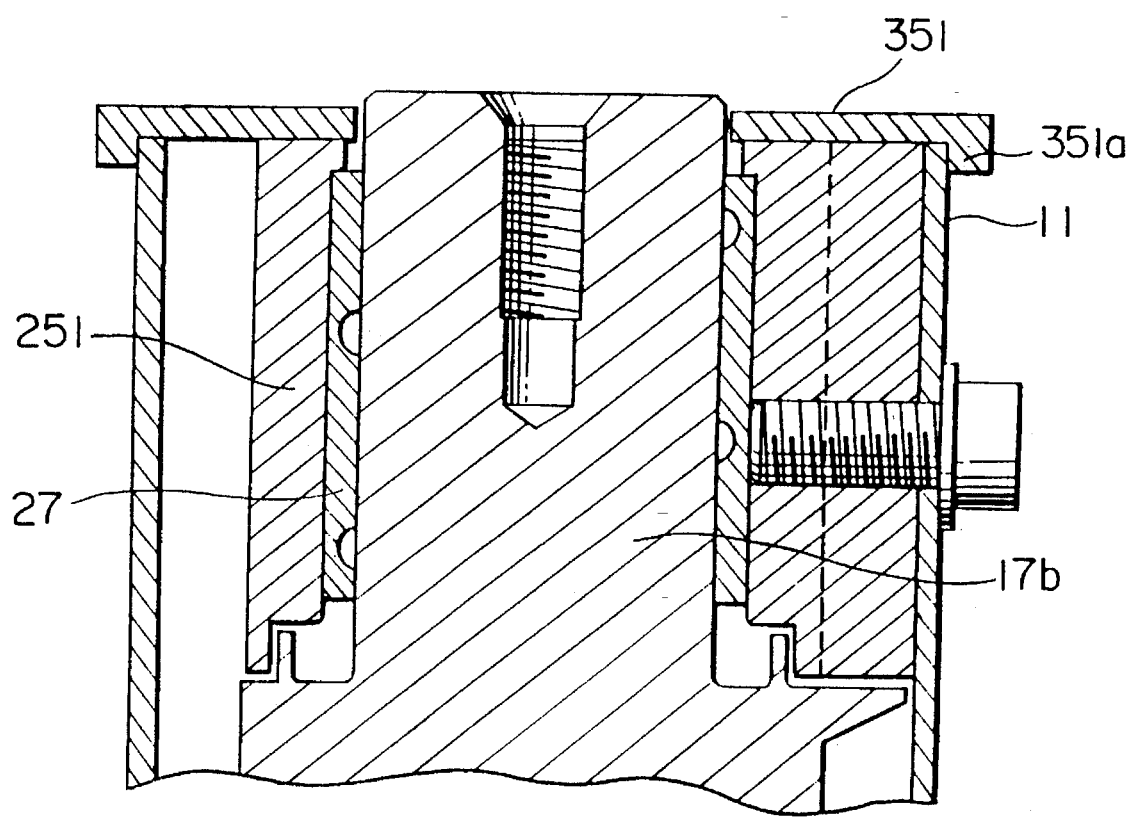
FIG. 12 is a sectional view showing the bearing structure using the gauge ring shown in FIG. 11.
Figure 13:
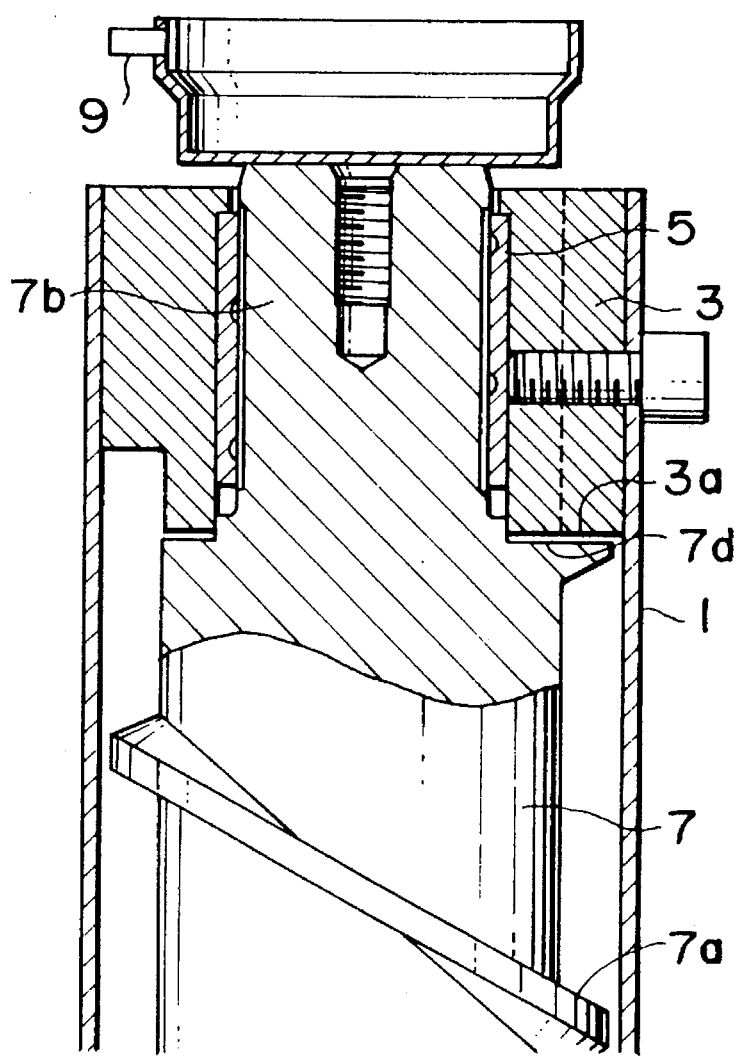
FIG. 13 is a partial sectional view showing a conventional bearing structure for auger-type ice making machines.

As shown in FIG. 11, it is also possible to form a downwardly bent, annular protrusion 351a in the outer peripheral section of the gauge ring 351 and fit the protrusion 351a onto the outer periphery of the upper end portion of the refrigeration casing 11, as shown in FIG. 12, thereby positioning the gauge ring 351.

What is claimed is:

1. A bearing structure for auger-type ice making machines, comprising:

a vertical and cylindrical refrigeration casing having an upper end portion and an inner surface;

an auger rotatably mounted within said refrigeration casing having a helical blade for scraping off ice generated on the inner surface of said refrigeration casing and pushing the ice up and out of said refrigeration casing and an upper shaft section;

a slide bearing supporting said upper shaft section of said auger, said slide bearing having a bearing surface with a helical groove therein and lower and upper ends;

a press head provided inside said upper end portion of said refrigeration casing, said press head supporting said slide bearing; and substantially closed first and second foreign matter trap spaces formed adjacent to said lower and upper ends of said slide bearing.

2. The bearing structure for auger-type ice making machines according to claim 1 wherein a high-hardness metal layer is formed on the outer periphery of said upper shaft section of said auger.

3. The bearing structure for auger-type ice making machines according to claim 2, wherein the total volume of said first and second foreign matter trap spaces is at least 1.5 times as large as the total volume of said high-hardness metal layer.

4. The bearing structure for auger-type ice making machines according to claim 2, wherein said high-hardness metal layer has a thickness of at least 0.3 mm.

5. The bearing structure for auger-type ice making machines according to claim 2, wherein said high-hardness metal layer is formed of a nickel-chrome alloy.

6. The bearing structure for auger-type ice making machines according to claim 5 wherein the nickel-chrome alloy contains tungsten-carbide.

7. The bearing structure for auger-type ice making machines according to claim 1, wherein said auger has a shoulder portion, said first foreign matter trap space is defined by said shoulder portion, the lower end of said slide hearing, and said press head, and said second foreign matter trap space is defined by said press head, an annular cover, and said upper shaft section of said auger.

8. The bearing structure for auger-type ice making machines according to claim 7, wherein an annular protrusion is formed on said shoulder portion of said auger, and an outer peripheral portion at the lower end of said press head extends downwards so as to cover the outer peripheral surface of said annular protrusion of said auger, whereby said first foreign matter trap space is closed.

9. The bearing structure for auger-type ice making machines according to claim 7, wherein an annular protrusion is formed on said shoulder portion of said auger and is inserted into an annular groove formed in the lower end portion of said press head, whereby said first foreign matter trap space is closed.

10. The bearing structure for auger-type ice making machines according to claim 7, wherein an annular protrusion is formed at the lower end of said press head and is inserted into an annular groove formed in said shoulder portion of said auger, whereby said first foreign matter trap space is closed.

11. The bearing structure for auger-type ice making machines according to claim 7, wherein a downwardly bent annular protrusion is formed on the outer periphery of said annular cover and is inserted into an annular groove formed in an upper end portion of said press head, whereby said second foreign matter trap space is closed.

12. The bearing structure for auger-type ice making machines according to claim 7 wherein said annular cover is a gauge ring for detecting the wear amount of said slide bearing and said upper shaft section of said auger.

13. The bearing structure for auger-type ice making machines according to claim 12, wherein a difference $2 \cdot d_4$ between an inner diameter of said gauge ring and an outer diameter of said upper shaft section is set within a range which satisfies the following condition:

$$L-0.05 \leqq d_4 \leqq L,$$

where a permissible wear dimension of said slide bearing and said upper shaft section is L.

* * * * *

UNITED STATES PATENT AND TRADEMARK OFFICE
CERTIFICATE OF CORRECTION

PATENT NO. : 5,531,079
DATED : July 2, 1996
INVENTOR(S) : Susumu TATEMATSU et al.

It is certified that error appears in the above-indentified patent and that said Letters Patent is hereby corrected as shown below:

On the title page, insert as Section 73: --Assignee: Hoshizaki Denki Kabushiki Kaisha, Aichi-ken, Japan--.

Signed and Sealed this

Second Day of September, 1997

*Attest:*

BRUCE LEHMAN

*Attesting Officer*     *Commissioner of Patents and Trademarks*